E. L. WILLIAMS & E. JONES.
SHOCK ABSORBER.
APPLICATION FILED MAR. 10, 1915.
1,155,182.
Patented Sept. 28, 1915.
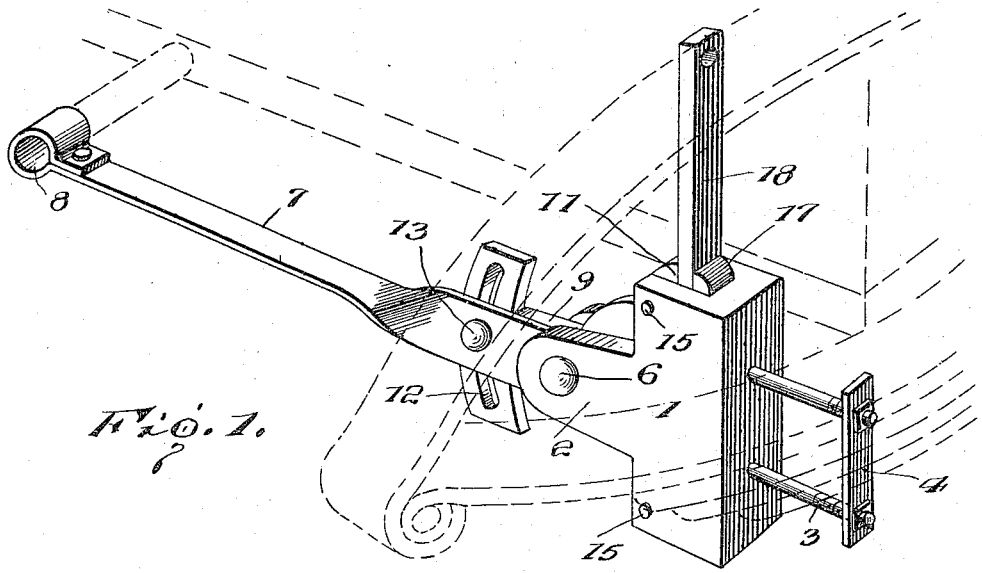
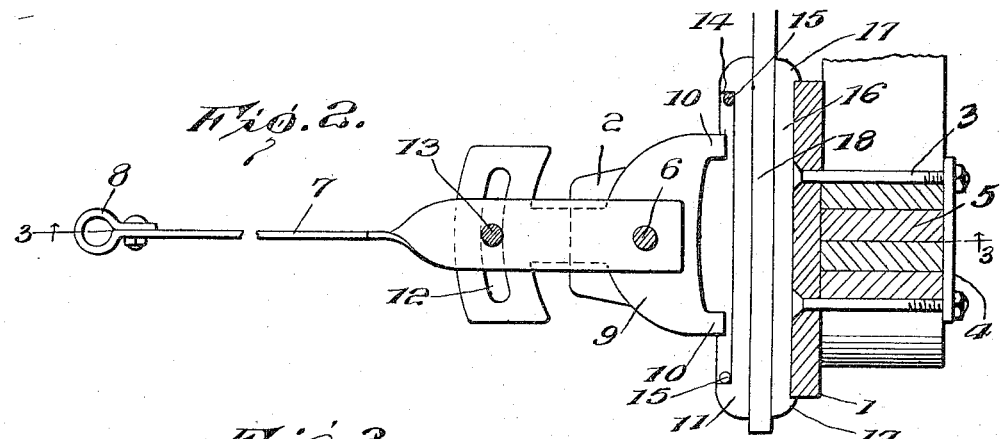
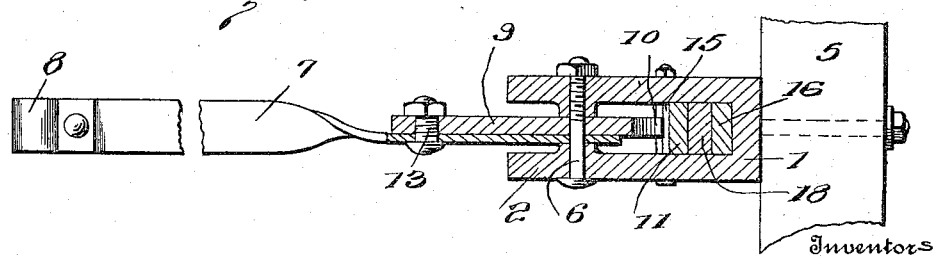
Inventors
E. L. Williams,
and E. Jones,
Witnesses
By
Attorneys

UNITED STATES PATENT OFFICE.

ERNEST L. WILLIAMS AND EMMETT JONES, OF HOPLAND, CALIFORNIA.

SHOCK-ABSORBER.

1,155,182.  Specification of Letters Patent.  Patented Sept. 28, 1915.

Application filed March 10, 1915. Serial No. 13,415.

*To all whom it may concern:*

Be it known that we, ERNEST L. WILLIAMS and EMMETT JONES, citizens of the United States, residing at Hopland, in the county of Mendocino and State of California, have invented certain new and useful Improvements in Shock-Absorbers, of which the following is a specification.

Our invention relates to shock absorbers, and has for its object the provision of a simple device which may be readily applied to any vehicle and by the use of which the movement vertically of the body of the vehicle in either direction will be absorbed.

The invention also seeks to provide a device for the stated purpose which will be composed of few parts and not liable to get out of order and which will be so constructed as to be protected against damage from any stones which may be thrown up by the wheel of the vehicle.

The invention is illustrated in the accompanying drawings and consists in certain novel features which will be hereinafter first fully described and then more particularly pointed out in the appended claims.

In the drawings: Figure 1 is a perspective view of our improved shock absorber showing the same in its applied position; Fig. 2 is a longitudinal vertical section; and Fig. 3 is a horizontal section on the line 3—3 of Fig. 2.

In carrying out our invention, we employ a body 1, which may conveniently be a channeled casting, provided with perforated lugs or arms 2 which project from its sides to embrace the brake lever and parts co-acting therewith. This body is also provided with bolts 3 and a clamp plate 4 whereby it may be secured to the lower member 5 of the vehicle spring. A bolt or pin 6 is inserted through the lugs 2, and this bolt receives the end of a leaf spring 7 which extends inwardly from the body and has its inner end secured to the body of the vehicle at any convenient point. The spring may be equipped at its inner end with an eye or loop 8 which may engage the starting crank, but the particular manner of securing the inner end of the spring is immaterial, the only essential being that the spring be secured to the vehicle body or frame.

Mounted upon the bolt 6 is a brake lever 9 which is extended above and below the said bolt and is equipped at the upper and lower extremities of its extended portion with bearing points 10 adapted to engage against a brake shoe 11. The inner end of the brake lever 9 is provided with an arcuate slot 12 which follows a curve having the bolt 6 as its center, and a bolt 13 carried by the spring 7 extends through the said slot. The brake shoe 11 is provided on its inner face near its upper and lower ends with shoulders 14 which are adapted to engage pins 15 inserted through the sides of the body 1, whereby the said brake shoe will be held against vertical movement. A second brake shoe 16 is mounted between the sides of the body 1 and has offset or shouldered portions 17 at its upper and lower ends which engage the upper and lower edges of the body, as clearly shown in Fig. 2, whereby vertical movement of the said brake shoe when the parts are assembled will be prevented. Between the two brake shoes and in frictional engagement therewith is a brake bar 18 which is attached to the vehicle body or frame.

It is thought the operation of our device will be readily understood from the foregoing description, taken in connection with the accompanying drawings.

If the vehicle be traveling along a perfectly smooth road, the parts will assume the position shown in Fig. 2, in which the spring will lie substantially horizontally and the brake lever 9 will be out of contact with the adjacent brake shoe 11. Should the wheels strike a rut and the axle thereby move downwardly relative to the vehicle body, the body 1 of our schock absorber will follow the movement of the lower member of the spring which is attached to the axle. The end of the spring 7 being secured to the vehicle body, it will move downwardly also but be somewhat behind the downward movement of the axle and the wheels, the result being that the spring and the lever 9 will be rocked so that the upper bearing point 10 will be thrown against the brake shoe 11 which will be thereby forced toward the shoe 16 and clamp the brake bar 18 so that the downward movement of the vehicle body will be retarded. Upon an upward movement of the lower member of the vehicle spring, the lower bearing point 10 will be thrown against the adjacent brake shoe and, consequently, the upward movement of the body relative to the axle will be retarded and absorbed.

The eye or loop 8 is not intended to fit closely to the cranking shaft or other part of the vehicle to which it is attached but, should have some play thereon so as to accommodate relative angular movement of the parts of the mechanism in the operation of the shock absorber. The bolt 13 serves to secure the spring 7 at such point of the slot 12 as is necessary to accommodate the spring 7 to the heights of different vehicles so that the eye or loop 8 may be attached to the vehicle at the proper place to bring the lever 9 into normal position and, when the bolt 13 is set, the elements 7 and 9 constitute practically a single resilient lever.

Our device is exceedingly simple in its construction and the arrangement of its parts and will efficiently overcome the shocks due to riding over a rough road, thereby contributing to the comfort of the riders, as well as reducing the wear upon the parts of the vehicle and minimizing the liability of the same to be damaged.

Having thus described the invention, what is claimed as new is:—

1. In a shock absorber, the combination of a body, a spring secured in the body and extending laterally therefrom, the body and the free end of the spring being secured to relatively movable parts of a vehicle, a brake bar secured to the vehicle body and depending therefrom through the shock absorber body, brake shoes held within the body and embracing the said brake bar, and means controlled by the said spring for applying pressure laterally to said brake shoes.

2. The combination of a body having lugs extending from its sides, a spring having one end fitted between the said lugs and its opposite end secured to a vehicle body, a brake bar secured to the vehicle body and depending therefrom through the first-mentioned body, and a brake lever mounted between the lugs on said first-mentioned body and connected with the said spring whereby to apply pressure to the said brake bar.

3. The combination of a body adapted to be secured to a vehicle spring and provided with lateral lugs, a spring pivoted between said lugs and adapted to be secured to a vehicle body, a brake bar secured to the vehicle body and depending therefrom past the first-mentioned body, a brake lever pivotally mounted between the said lugs and having an extended end arranged to apply pressure to the said brake bar and provided inwardly beyond the said lugs with an arcuate slot, and a bolt carried by the said spring and engaging the said slot.

4. The combination of a channeled body adapted to be secured to a vehicle spring and having laterally extending lugs, a pair of brake shoes fitted in the channel of the said body and provided on their outer faces at their opposite ends with lateral shoulders, the shoulders on one of said shoes engaging the upper and lower ends of the body, pins inserted through the body and engaging the shoulders on the other shoe, a brake bar secured to the vehicle body and depending therefrom between said shoes, a spring secured within the lugs and extending therefrom, and a brake lever pivoted between the said lugs and adjustably connected with the said spring and adapted to engage the adjacent brake shoe and thereby apply pressure to the brake bar.

In testimony whereof we affix our signatures in presence of two witnesses.

ERNEST L. WILLIAMS. [L. S.]
EMMETT JONES. [L. S.]

Witnesses:
JOHN F. HENDERSON,
CLEMENT BEATTIE.

Copies of this patent may be obtained for five cents each, by addressing the "Commissioner of Patents, Washington, D. C."